US010897859B2

(12) United States Patent
Einav

(10) Patent No.: US 10,897,859 B2
(45) Date of Patent: *Jan. 26, 2021

(54) INTEGRAL DRIPPER WITH AN ELONGATED EXIT POOL

(71) Applicant: RIVULIS PLASTRO LTD., Kibbutz Gvat (IL)

(72) Inventor: Zvika Einav, Kibbutz Gvat (IL)

(73) Assignee: Rivulis Plastro Ltd., Kibbutz Gvat (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/396,322

(22) Filed: Apr. 26, 2019

(65) Prior Publication Data

US 2019/0246578 A1 Aug. 15, 2019

Related U.S. Application Data

(60) Continuation of application No. 15/180,519, filed on Jun. 13, 2016, now Pat. No. 10,271,484, which is a (Continued)

(30) Foreign Application Priority Data

Apr. 3, 2011 (IL) .......................................... 212105

(51) Int. Cl.
*A01G 25/02* (2006.01)
*B05B 1/20* (2006.01)
(Continued)

(52) U.S. Cl.
CPC ............ *A01G 25/023* (2013.01); *B05B 1/202* (2013.01); *B29C 48/09* (2019.02); *A01G 25/02* (2013.01);
(Continued)

(58) Field of Classification Search
CPC ....... B05B 1/202; B05B 1/3006; B05B 1/323; B05B 1/044; B05B 7/12; B05B 7/1254;
(Continued)

(56) References Cited

U.S. PATENT DOCUMENTS 4,060,200 A * 11/1977 Mehoudar .............. A01G 25/02
239/542
4,392,616 A * 7/1983 Olson ................... A01G 25/023
239/271
(Continued)

FOREIGN PATENT DOCUMENTS

IL 86549 A 4/1991
WO 2010055530 A1 5/2010
WO 2010095127 A1 8/2010

*Primary Examiner* — Joseph A Greenlund
(74) *Attorney, Agent, or Firm* — Rodney J. Fuller; Booth Udall Fuller, PLC

(57) ABSTRACT

A discrete flat dripper of the non-pressure regulated type of drippers or of the pressure compensated—flow rate regulated type of drippers, suited for being integrally installed within a hose, that comprises a body component whose configuration is essentially rectangular, wherein on its one side that is suited to being affixed to an internal wall of the hose, formed with an exit pool that it is elongated in its dimensions and substantially extends along the entire length of the body component, and with a flow passage circumferentially surrounding a substantial part of the elongated exit pool, and an integral dripper line wherein there are integrated at least one of such discrete flat dripper.

16 Claims, 10 Drawing Sheets

Figure 1:
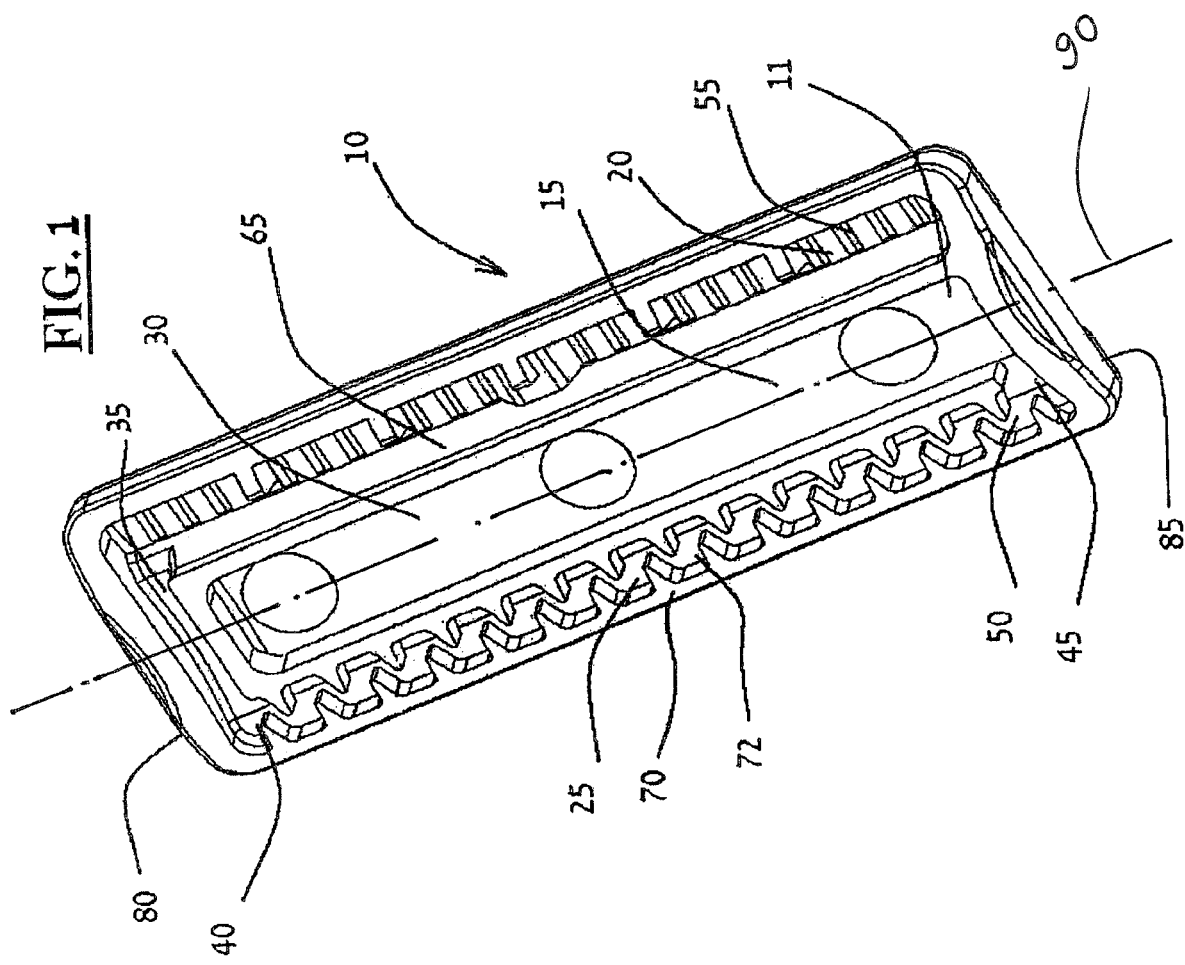

Related U.S. Application Data division of application No. 14/009,395, filed as application No. PCT/IL2012/050115 on Apr. 2, 2012, now Pat. No. 9,386,752.

(51) Int. Cl.
  *A01G 25/16* (2006.01)
  *B29C 48/09* (2019.01)
  *B29C 48/157* (2019.01)
  *B29C 45/16* (2006.01)
  *B29L 31/00* (2006.01)

(52) U.S. Cl.
  CPC ............ *A01G 25/16* (2013.01); *A01G 25/165* (2013.01); *B29C 45/16* (2013.01); *B29C 48/157* (2019.02); *B29L 2031/70* (2013.01)

(58) Field of Classification Search
  CPC ...... A01G 25/02; A01G 25/023; A01G 25/16; A01G 25/165
  USPC .......................................................... 239/542
  See application file for complete search history.

(56) References Cited

U.S. PATENT DOCUMENTS

| | | | |
|---|---|---|---|
| 4,460,129 A * | 7/1984 | Olson | A01G 25/023 239/542 |
| 5,022,940 A | 6/1991 | Mehoudar | |
| 5,183,208 A | 2/1993 | Cohen | |
| 5,615,838 A * | 4/1997 | Eckstein | A01G 25/023 239/533.1 |
| 5,634,594 A * | 6/1997 | Cohen | A01G 25/023 239/542 |
| 5,829,685 A * | 11/1998 | Cohen | A01G 25/023 239/533.1 |
| 6,027,048 A * | 2/2000 | Mehoudar | A01G 25/023 239/542 |
| 6,206,305 B1 | 3/2001 | Mehoudar | |
| 6,250,571 B1 * | 6/2001 | Cohen | A01G 25/023 239/542 |
| 6,302,338 B1 * | 10/2001 | Cohen | A01G 25/023 239/542 |
| 6,382,530 B1 | 5/2002 | Perkins | |
| 6,568,607 B2 | 5/2003 | Boswell | |
| 7,681,810 B2 * | 3/2010 | Keren | A01G 25/02 239/542 |
| 7,988,075 B2 | 8/2011 | Altenburger | |
| 7,988,076 B2 * | 8/2011 | Mamo | B29C 45/14598 239/542 |
| 8,002,496 B2 | 8/2011 | Giuffre | |
| 8,096,491 B2 * | 1/2012 | Lutzki | A01G 25/023 239/542 |
| 8,141,589 B2 * | 3/2012 | Socolsky | A01G 25/023 138/42 |
| 8,302,887 B2 * | 11/2012 | Park | A01G 25/023 239/542 |
| 8,317,111 B2 * | 11/2012 | Cohen | A01G 25/023 239/542 |
| 8,348,182 B2 * | 1/2013 | Keren | A01G 25/02 239/547 |
| 8,763,934 B2 * | 7/2014 | Patel | A01G 25/023 239/542 |
| 8,998,113 B2 * | 4/2015 | Keren | A01G 25/023 239/542 |
| 9,386,752 B2 * | 7/2016 | Einav | A01G 25/023 |
| 2005/0284966 A1 | 12/2005 | DeFrank | |
| 2007/0108318 A1 * | 5/2007 | Mamo | A01G 25/023 239/542 |
| 2007/0194149 A1 * | 8/2007 | Mavrakis | A01G 25/06 239/542 |
| 2007/0289751 A1 | 12/2007 | Feenstra | |
| 2008/0067266 A1 * | 3/2008 | Cohen | A01G 25/023 239/542 |
| 2009/0165879 A1 | 7/2009 | Socolsky | |
| 2009/0212135 A1 | 8/2009 | Keren | |
| 2009/0302127 A1 | 12/2009 | Lutzki | |
| 2010/0155508 A1 * | 6/2010 | Keren | A01G 25/023 239/542 |
| 2010/0282873 A1 * | 11/2010 | Mattlin | A01G 25/023 239/542 |
| 2012/0012682 A1 * | 1/2012 | Einav | A01G 25/023 239/542 |
| 2015/0150199 A1 * | 6/2015 | Kidachi | A01G 25/023 239/542 |
| 2015/0201568 A1 * | 7/2015 | Einav | A01G 25/02 239/542 |

* cited by examiner

INTEGRAL DRIPPER WITH AN ELONGATED EXIT POOL

CROSS-REFERENCE TO RELATED APPLICATIONS

This application is continuation of U.S. application Ser. No. 15/180,519, filed Jun. 13, 2016 (published as U.S. 20160286743), which is a divisional of U.S. application Ser. No. 14/009,395, filed Oct. 2, 2013 (now U.S. Pat. No. 9,386,752), which is the U.S. National Stage of International Application No. PCT/IL2012/050115, filed Apr. 2, 2012, which claims the benefit of and priority to Israel Patent Application No. 212105, filed Apr. 3, 2011, the contents of each of which are incorporated herein in their entireties.

FIELD OF THE INVENTION

The invention, the subject matter of this patent application, is found in the field of drippers used for agricultural irrigating (watering) in general (in other words—drip irrigation emitters), and in the domain of the flat integral drippers in particular, namely—in the domain of drip irrigation emitters that are formed as flat, discrete units, that are integrated within an irrigation hose and positioned length wise along its length, at distances one from the other, wherein they are attached flush adjacent to the inner wall of the hose, and wherein they are formed with a water exit "pool" that is formed on their outer surface areas which are adapted to be affixed as said, to the inner wall of the hose, while the water outlet opening that is formed in the hose's wall opposite that water exit "pool" and within its bounds, provides for a water flow passage between the dripper's water exit "pool" and the external side of the hose, and hence enables the desired water exiting outwards from the irrigation hose.

BACKGROUND OF THE INVENTION

Methods and means for continuous manufacturing of integral dripper lines (known also as in-line drip lines), with discrete flat drippers (drip irrigation emitters) integrated in them, are familiar and well known. For example, integrating the drippers and attaching them flush unto the inner wall might be formed during the process of manufacturing the hose (in other words—the conduit or hose), by extrusion (see for example U.S. Pat. No. 5,022,940 or IL patent No. 86549).

In order to maintain a beneficial competitive edge, manufacturing of integrated dripper lines in which discrete flat drippers are integrated mandates as high as practicable manufacturing rates. From its inception, the drippers have to be designed in such a manner that it would be possible to feed (insert) them in the hoses' production line at (very) high rates, while avoiding, as much as feasible—occurrences of mistakes in the feeding direction of the discrete flat drippers relative to the wall of the hose. In other words, designers of the drippers are required to design the drippers in a symmetric configuration, to the highest possible result, in order to reduce the impeding sorting operations—namely the requirements governing the preliminary adjustment and orientation of the dripper relative to the direction of the wall of the hose, even before they are attached flush to the inner wall of the hose, so that for example, it would be feasible forming the water outlet opening in the wall of the hose, accurately facing (opposite) the exit "pool" and within its boundaries.

The drippers have to be made in small dimensions—in order to save on the costs of the raw material that serve for their production (and—as well—to enable their speedy feeding (insertion) as said). The raw material, from which the dripper's components are manufactured, constitutes a dominant component of the cost of manufacturing of the integral dripper hoses.

In case of a non-pressure compensated dripper, the dripper is a mono-component (a single one), namely—the body component. In case of a 'pressure compensated' dripper, or in other words—'flow rate regulated' dripper. A typical dripper is made of usually three components, which are: a body member, a cover element and an elastomeric membrane (diaphragm) assembled between the body member and the cover element).

Hence, the designers of the drippers are required to decrease and reduce the dimensions (size) of the drippers as much as practicable (and thus achieve the savings in the costs of the materials and of other attending costs).

As opposed to this, in order to facilitate as much as practicable the task of conforming with the challenge of locating the water exit "pool" that is formed in the body of the dripper and accurately forming as well the water outlet openings in the wall of the hose into it and within its boundaries, the designers of the drippers strive to precisely increase and widen as much as possible, the surface area of that water exit "pool".

Rather in the same manner, striving to filter as much as possible the water entering into the dripper (in order to prevent the formation or development of clogging up in the narrow passage of the pressure reducing mechanism in the dripper), this need also mandates assigning substantial area for increasing the area of the filtering means (and thus increasing the dripper's size). Similarly, striving to leave as large as possible minimal flow passage in the water pressure reducing means formed in the dripper (for example—the flow passage formed between the baffles of a water pressure reducing means of the labyrinth type), in order to prevent clogging, also leads to increase the dripper's size (and as per the example above, assigning a larger area to the labyrinth type water pressure reducing means enables to lengthen it, and this lengthening in its turn enables to increase the dimensions of the minimal flow passage in it).

An additional aspect which is critical in the realm of manufacturing integral dripper hoses with flat drippers integrated in them is the required assurance of properly affixing the body of the dripper unto the inner wall of the hose. Irrigating hoses might be manufactured in a (large) variety of inner diameters. In order to achieve reliable affixing of the body of the dripper unto the surface of the inner wall of the hose and because of the aforesaid large variety of actually manufactured different hoses, it is necessary to achieve suitability of the surface of the flat drippers that are adapted to be affixed flush unto the surface of the inner wall of the hose, to the outline of the surface of the inner wall of the hose (an outline that—in accordance to all the stipulations that were stated above might be different from one to another in accordance with the inner diameter of a specific hose). Hence, it is familiar and well known in this field—to form the surface of the flat drippers that are intended to be attached (affixed) flush to the inner wall of the hose, in an arched outline (in accordance with the inner radius of the hose). The variety of the diameters of the hoses might, hence, necessitate forming bodies of drippers with surface outlines in accordance with the specific radius of the inner wall of the hose unto which the drippers are designated to be affixed or alternatively, the designers of the drippers strive precisely to narrow, as much as possible, the dripper's width (in order that they will be properly affixed to a variety of inner diameters).

Integral dripper hoses might be buried in the ground (in order to ensure fast wetting of the ground and in order to prevent their moving in high winds). Burying the hose in the ground might worsen the problem of clogging from the instant that the water pressure drops in the hose and causes a phenomenon of sucking (suction) from the outside inwards of soil, sand, debris and the like. A familiar and well known solution is forming a water exit outlet at the wall of the hose in a configuration of an elongated thin slit (e.g.—formed by laser or sharp blade), such that as the water pressure drops inside the hose, it "closes" itself within the hose and prevents contaminating bodies from entering from the instant the sucking phenomena starts. This type of solution is known for applications of integral dripper hoses in which a continuous and flat strip of drippers is integrated (as different from a hose with discrete flat drippers within it). The configuration of the continuous strip enables forming a long water exit "pool" along the pressure reducing means, in a manner that enables forming the elongated and thin slit at the wall of the hose within its domain.

There exists a problem here—that in integrated dripper hoses with flat discrete drippers integrated in them (as different from integral irrigating hoses with a continuous strip of drippers), the water exit "pool" that is formed in each and every one of the discrete drippers, has to be of large enough dimensions, so that the water exit outlet (in the thin and elongated slit configuration as is required) would verily be amenable to be formed on the wall of the hose opposite said specific "pool" wherein it connects to a flow passage between it and the outer side of the hose, but also at the same time is characterized by the property of "self closing" from the instant the water pressure is being reduced in the hose (which is the possible solution to the suction problem and the danger of clogging following it, as we have pointed above). A design challenge that makes the situation even more stringent—achieving the "self closing" property, necessitates a relative long slit. Increasing the length of the slit compels (dictates) to increase as well the dimensions of the "pool" in the body of the discrete dripper, in a manner that on the face of it is in contradiction to the other challenge of reducing the dimensions of the dripper as we have pointed before.

Thus, as per integral dripper hoses with relatively thin walls, it is rather common, for example, to encounter the usage of flat and continuous strip drippers that—as said—enables forming sufficient long enough exit "pools" that would include within their boundaries the relatively long slit formed at the thin wall of the hose. But also, simultaneously, the flat and continuous strip embodies drawbacks—more raw material is required to produce it (in comparison to discrete drippers), and also its water pressure reducing means formed in it, does not benefit from the advantages of accuracy that the injection technology provides (as in the manufacturing of discrete drippers). For example—forming a water pressure reducing means of the labyrinth type on a flat and continuous strip is executed by the embossing technology that does not enable to achieve the same high level of accuracy in the dimensions of the minimal flow passage between the labyrinth's baffles in comparison with the (rather) substantial accuracy that might be achieved when forming the dripper by injection technology (that is executed, as said, when manufacturing a discrete dripper).

Thus, in the time that preceded the present invention, there existed a need for discrete integral flat drippers, that would be small in their dimensions and that would not require complicated adjustment and orientation operations before being affixed (attached) flush to the inner wall of the hose, enable efficient filtering of the water entering into them and providing efficient reduction of the pressure of the water while maintaining a large as possible minimal flow passage at the water pressure reduction means that is implemented for this purpose (for example—a labyrinth), that would facilitate conforming with the challenge of forming a water exit outlet in the wall of the hose, with accuracy so that it is exactly opposite the exit "pool" that is formed on them, and that would also enable using a water exit outlet endowed with "self closing" features (namely—having a water exit outlet in a thin and long slit configuration).

SUMMARY OF THE PRESENT INVENTION

The present invention provides means to handle the need that we have pointed at earlier—by implementing a discrete, flat dripper, either of the non-pressure compensated type of drippers or of the pressure compensated (flow rate regulated type of drippers), that is suited to be integrally assembled within a hose and that—as any integral dripper like it, comprises a body component of an essentially rectangular configuration that—on its one side, the one that is suited to be attached flush to the inner wall of the hose, is formed with an exit pool that it is elongated in its dimensions and substantially extends along the entire length of said body component, and with a flow passage circumferentially surrounding a substantial part of said elongated exit pool for routing the water that entered the drippers—eventually towards said exit pool.

In an additional and different aspect of a discrete flat dripper in accordance with the present invention, the forming (shaping) of the exit pool, wherein it is elongated in its dimensions and substantially stretched (extending) along the complete length of the body component, defines a lengthwise axis so that the circumferential flow passage is formed in a symmetrical manner relative to it (in a manner that eliminates the need for operations of adjustment and setting the orientation in the "forward—backward" dimension, namely—enabling the feeding of the drippers either front forward or with its stern forward).

Wherein the invention is implemented in a non-pressure compensated type of drippers, the circumferential flow passage comprises a filtering means, a water pressure reduction means, and a flow passage that connects to a flow passage of filtered water from the filter means to one end of the water pressure reducing means. A water exit opening connects for a flow passage of filtered water, whose pressure was reduced, from a second end of the water pressure reducing means to the elongated exit pool.

Wherein the invention is implemented in a discrete flat dripper of the pressure compensated (flow rate regulated) type of drippers, the dripper additionally comprises—a cover component and an elastomer membrane, and wherein the body component is formed in two levels (stories). One level extends on one side of the body component, wherein from the instant of its installation in the hose it faces the wall of the hose and is formed, as said, with the elongated exit pool and with the circumferential flow passage that routes (leads) the flow towards the exit pool, and with a circumferential walls array that buffers (separates) between the elongated exit pool and the circumferential flow passage. The second level extends on the other side of the body component that from the instant of its installation in the hose faces towards the inner (inside) section of the hose. The second level is formed with a water entrance chamber and with a regulating chamber.

First water (flow) passage opening provides a flow passage between the levels, from the water entrance chamber to a one end of the circumferential flow passage. A second water flow passage connects for a water flow passage between the levels, from the second end of the circumferential flow passage to a one side of the regulating chamber. A third water flow passage connects for providing a flow passage between the levels, from that one side of the regulating chamber unto the elongated exit pool.

The cover component is suited (adapted) for being installed on the second side of the body component and is formed with filtering means for filtering the water entering into the water entrance chamber, and concurrently also enables entrance of water to the second side of the regulating chamber.

The elastomer membrane is suited (adapted) for being installed within (inside) the regulating chamber, in a manner that it separates between the one side of the regulating chamber to the second side of the regulating chamber, and enables its movement towards the third water flow passage and away from it in accordance with the difference of the pressures that prevails on the two side of the membrane, and thus the regulation of the water flow rate from the dripper is executed.

In another additional and different aspect of the present invention, it is embodied also in integral dripper hoses (in-line drip irrigation hoses) in which one or more drippers of the type described in the preceding summary above are integrated.

In an additional and different aspect of an integral drippers hose in accordance with the present invention, the water exit outlets that are formed in the wall of the hose opposite the exit pools that are formed in the discrete flat drippers in accordance with the present invention, wherein they are elongated in their dimensions and within their boundaries, those water exit outlets are in the configuration of a thin and long slit endowed with "self closing" properties as explained above, at the instant that the water pressure start to decrease in the hose.

This summary section of the patent application is intended to provide an overview of the subject matter disclosed herein, and should not be construed as limiting the invention to any features described in this summary section.

BRIEF DESCRIPTION OF THE ACCOMPANYING FIGURES

Examples illustrative of embodiments of the invention are described below with reference to figures attached hereto. In the figures, identical structures, elements or parts that appear in more than one figure are generally labeled with a same numeral in all figures in which they appear. Dimensions of components and features shown in the figures are generally chosen for convenience and clarity of presentation and are not necessarily shown to scale. The figures are listed below.

FIG. 1 constitutes a view in perspective of an example of a non-regulated dripper in accordance with the present invention.

Figure 2:
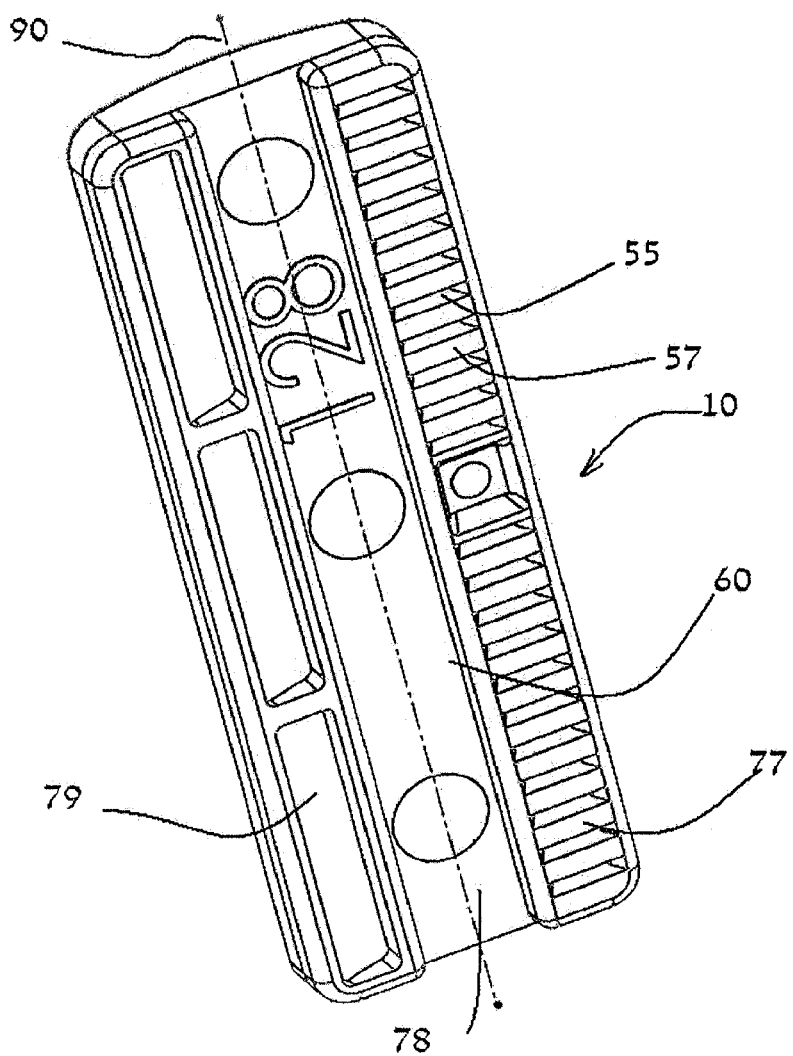

FIG. 2 constitutes a view in perspective from another angle of the dripper that is illustrated in FIG. 1.

Figure 3:
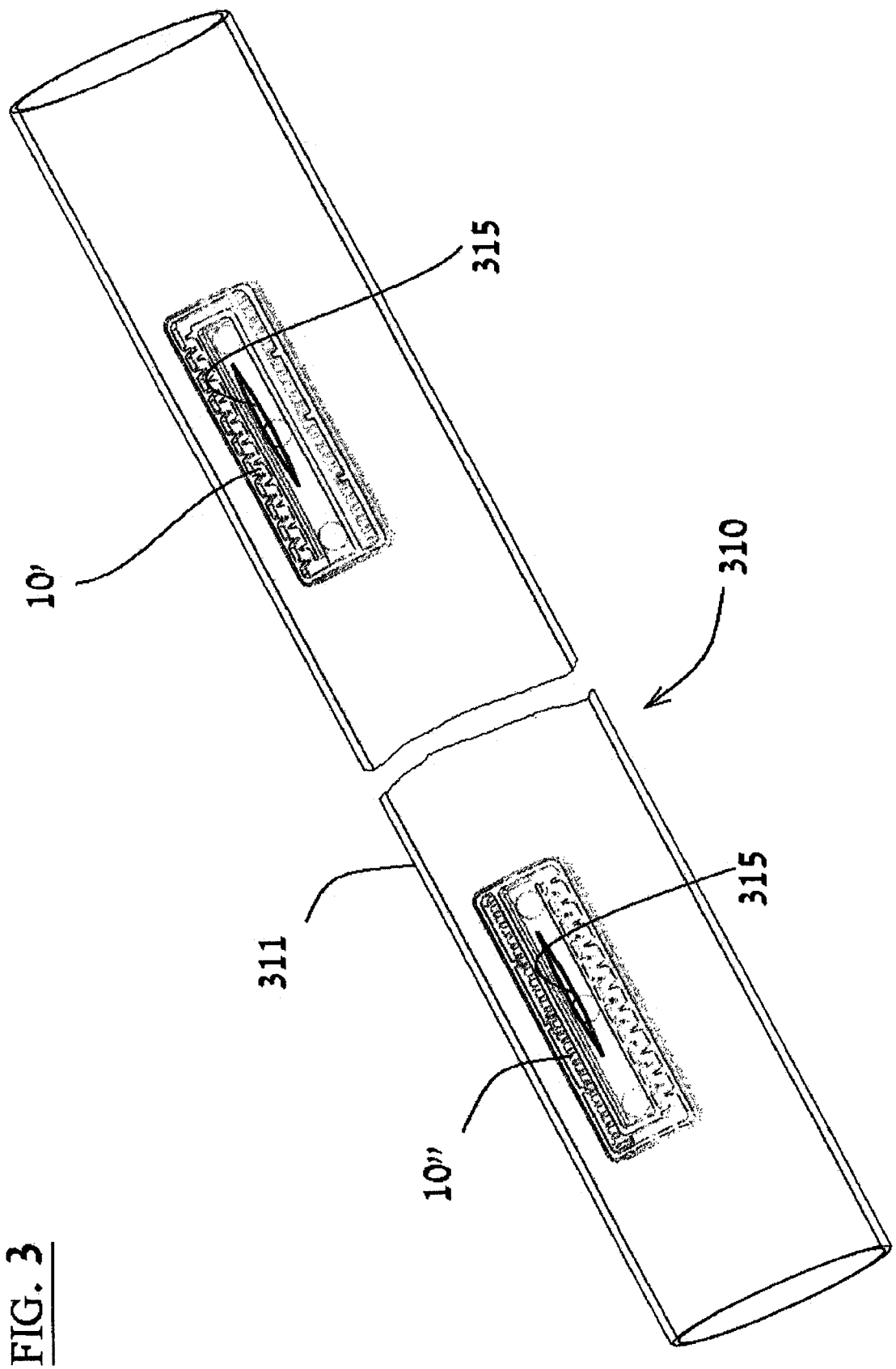

FIG. 3 constitutes a view in perspective of a sector of an integral dripper hose in which there are integrated drippers that were illustrated in FIGS. 1 and 2.

Figure 4:
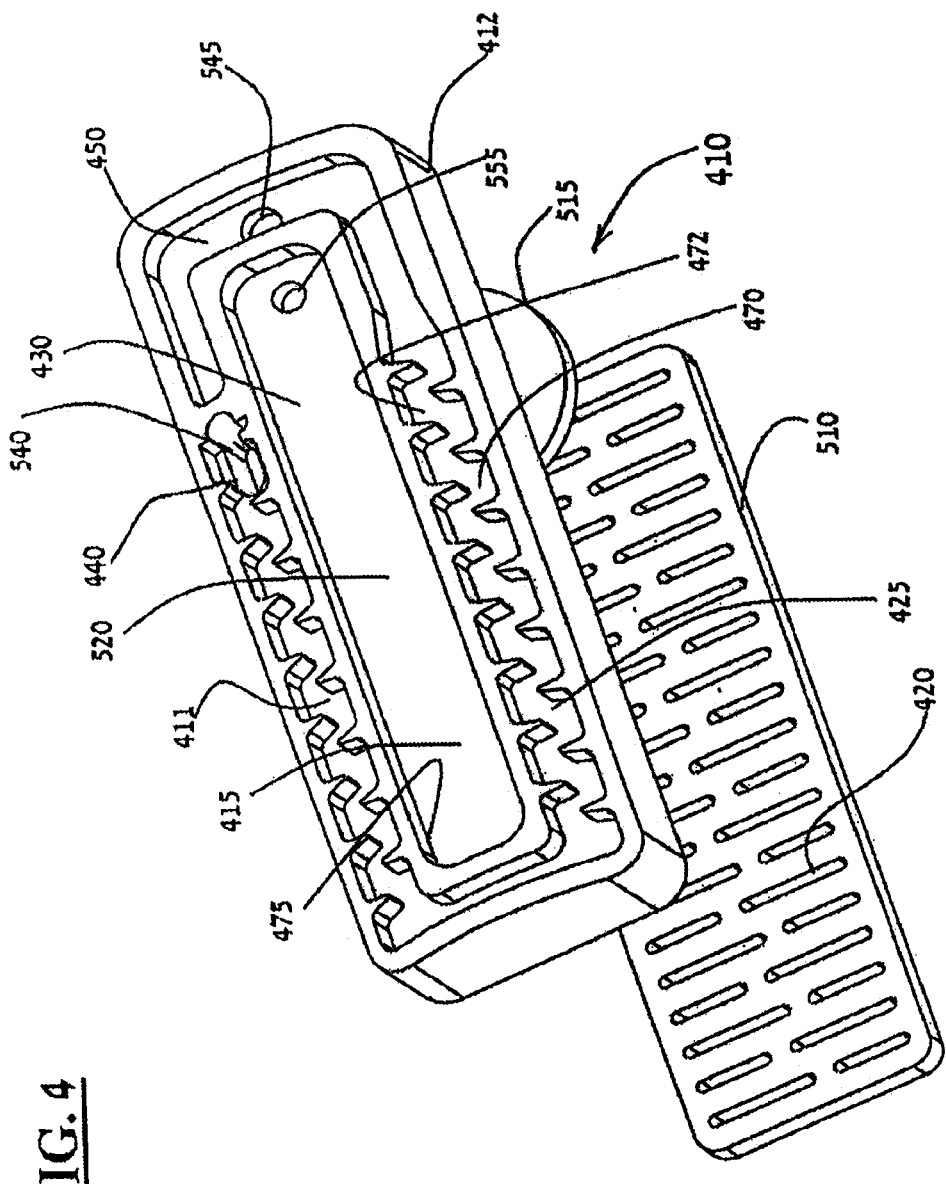

FIG. 4 constitutes an exploded (parts break down) view of the components of a flow rate regulated (pressure compensated) dripper in accordance with the present invention.

Figure 5:
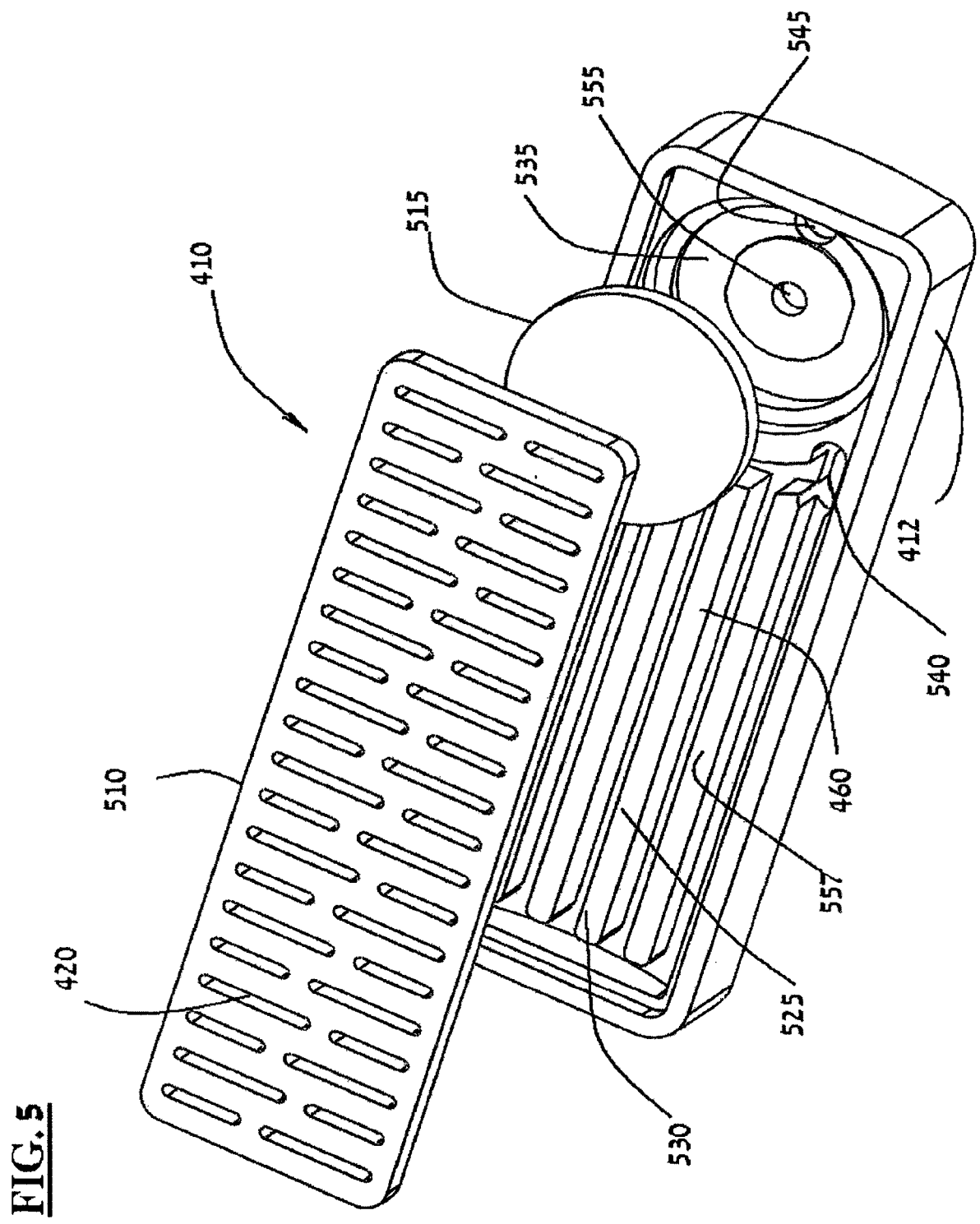

FIG. 5 constitutes an additional exploded view (from another viewing angle) of the components of the flow rate regulated (pressure compensated) dripper whose components were illustrated in FIG. 4.

Figure 6:
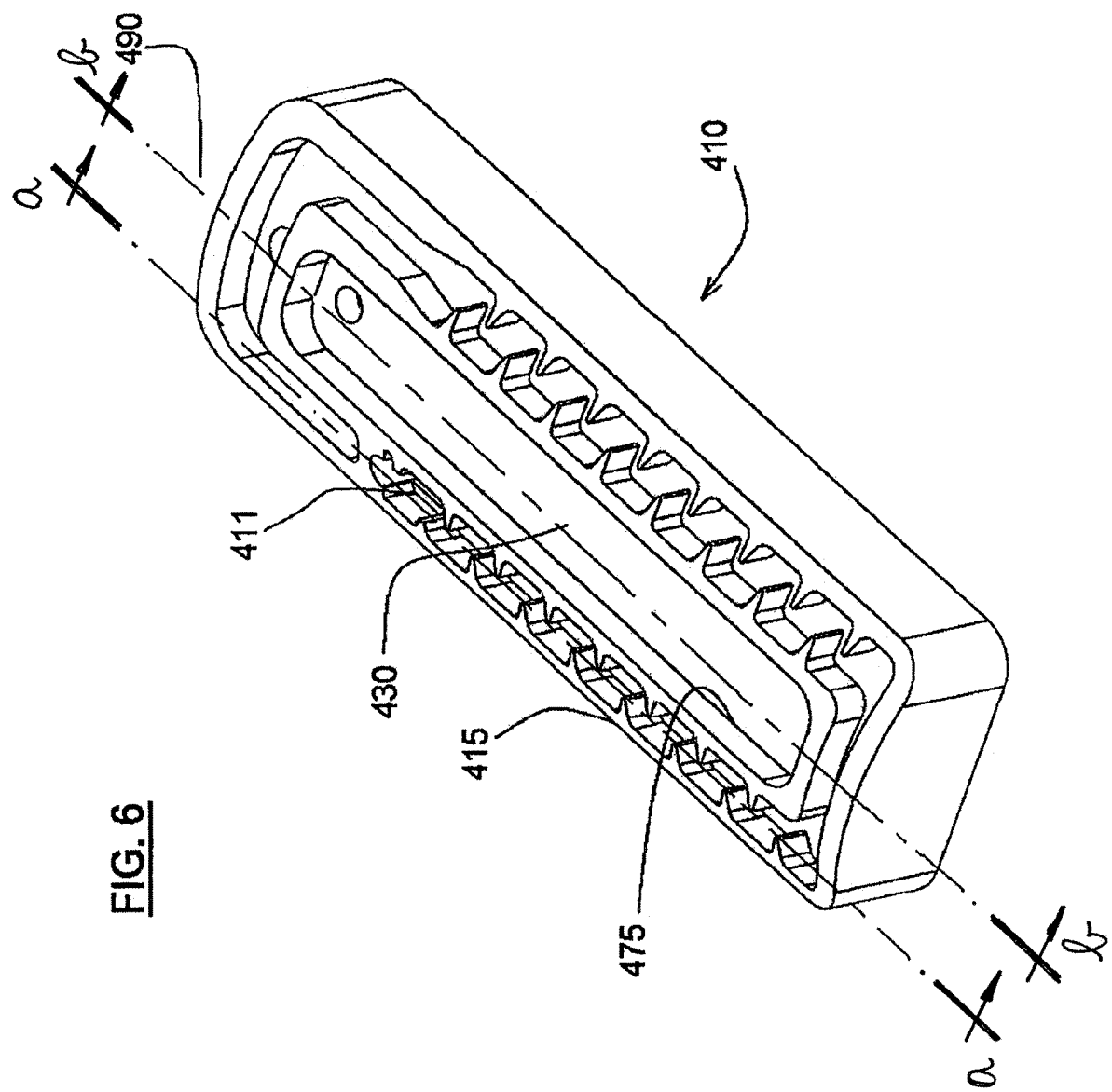

FIG. 6 constitutes a view in perspective of the flow rate regulated (pressure compensated) dripper whose components were illustrated in FIG. 4.

Figure 7:
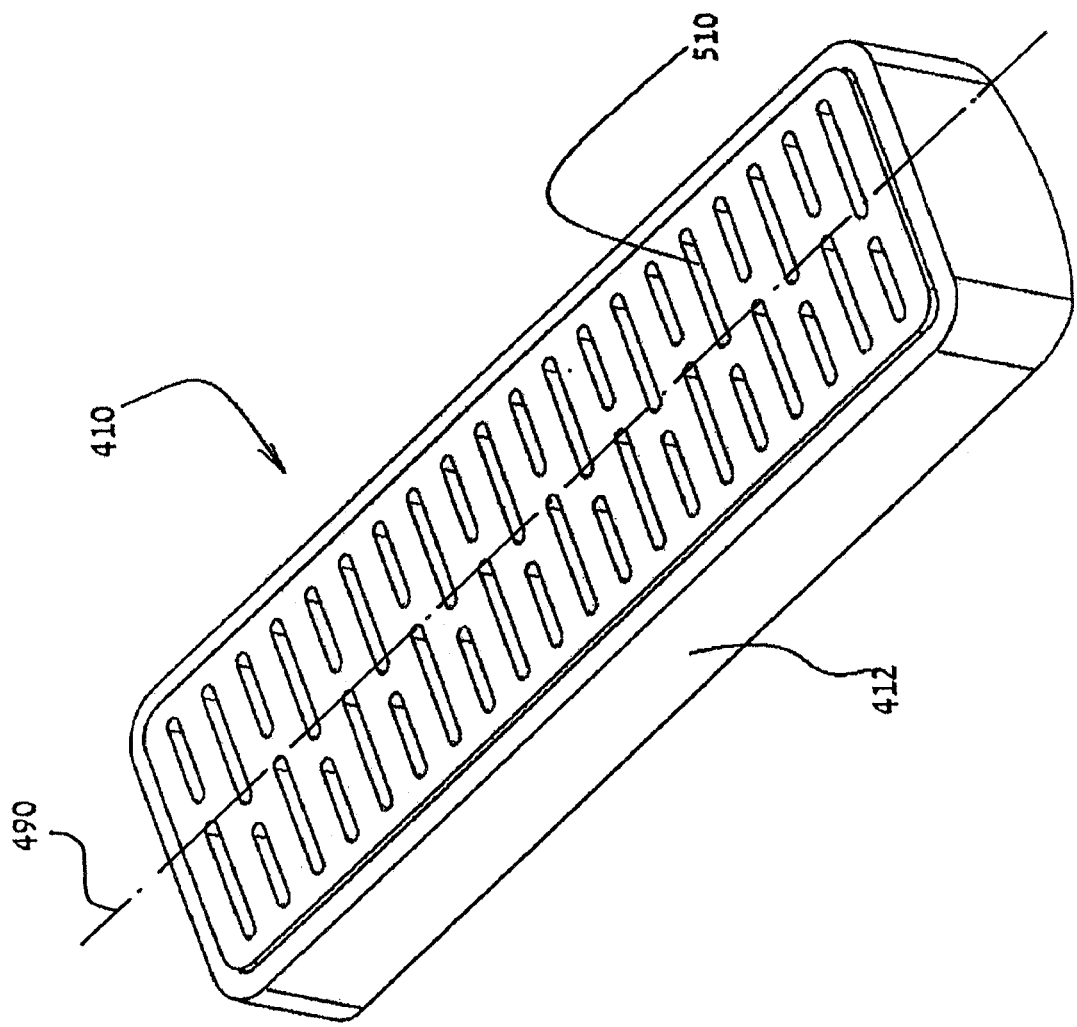

FIG. 7 constitutes a view in perspective (from another angle) of the dripper whose components were illustrated in FIG. 4.

Figure 8:
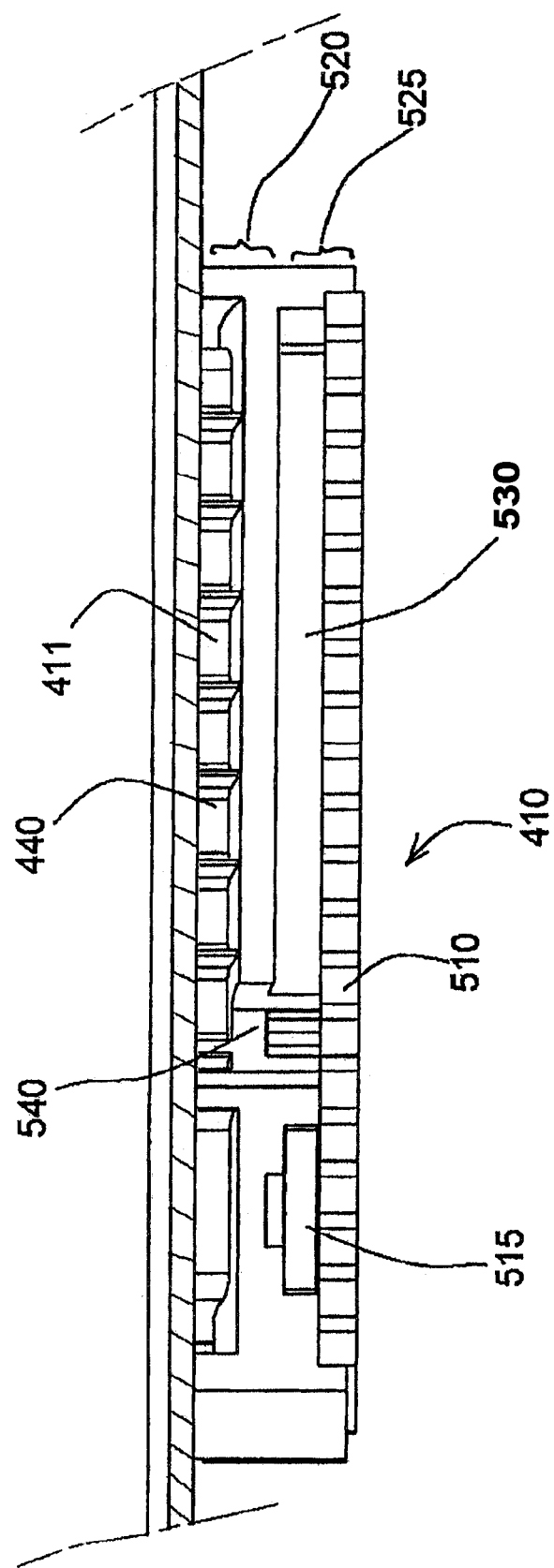

FIG. 8 constitutes a cross section view of the dripper that is illustrated in FIG. 6 (along the line marked a-a line).

Figure 9:
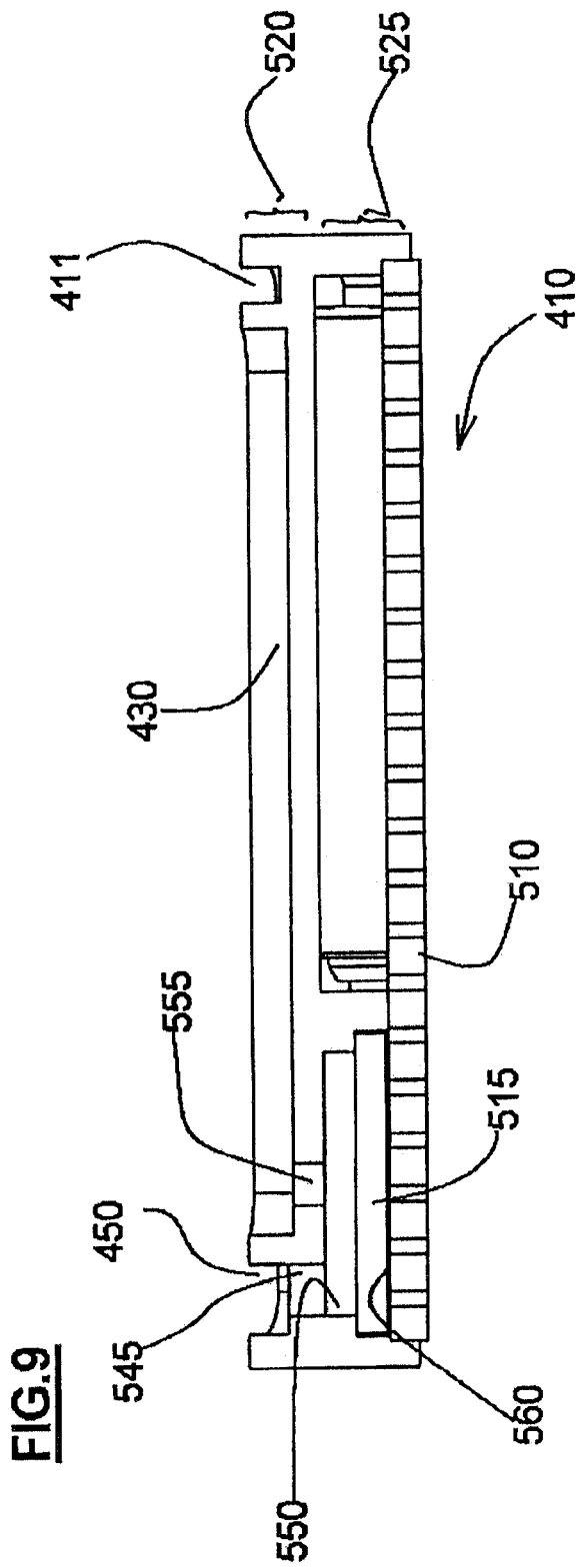

FIG. 9 constitutes a cross section view of the dripper that is illustrated in FIG. 6 (along the line marked b-b).

Figure 10:
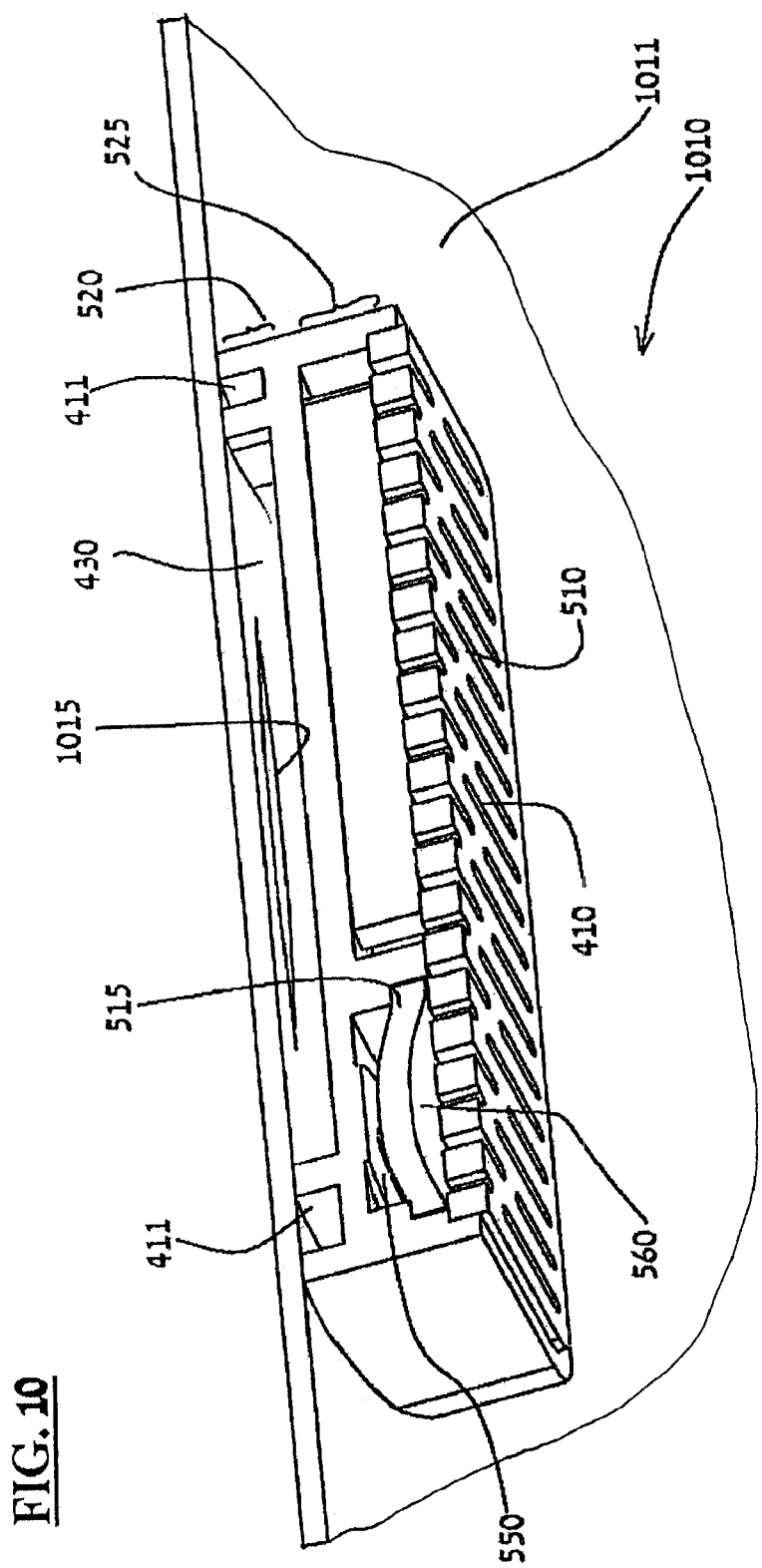

FIG. 10 constitutes a view in perspective of a cross section of a sector of integral drippers hose in which there is integrated a dripper as was illustrated in FIGS. 6 and 7.

DETAILED DESCRIPTION OF A PREFERRED EMBODIMENT

In the following description, various aspects of the invention will be described. For the purpose of explanation, specific configurations and details are set forth in order to provide a thorough understanding of the techniques. However, it will also be apparent to one skilled in the art that the techniques may be practiced without specific details being presented herein. Furthermore, well-known features may be omitted or simplified in order not to obscure the description(s) of the techniques.

Reference is being Made to FIGS. 1 and 2.

In FIGS. 1 and 2 there are illustrated examples of a non-regulated dripper 10 in accordance with the present invention (views in perspective and from two different angles).

Any professional in the field would easily understand that the topic being discussed is a discrete, flat dripper that is suited for being integrally assembled within an irrigation hose. In this example—a mono-component non-regulated dripper that is regularly manufactured by an injection process of plastic material into a mold, is in a configuration of a body component that has an essentially rectangular configuration, wherein on its one side—15, namely the side that is suited to being affixed flush unto the inner wall of the hose (that is not illustrated), is formed with filtering means 20, water pressure reducing means 25, and exit pool 30. A flow passage 35 connects to a flow passage of filtered water from filtering means 20 to one end 40 of the water pressure reducing means 25. A water exit opening 45 leads to a flow passage of filtered water that their pressure was reduced—from the other end 50 of the water pressure reducing means 25 to exit pool 30.

In the example, flat and discrete dripper 10 that is illustrated in the figures, water filtering means 20 comprises an array of slots 55 that are coupled to the passage of water flow through them from the other side—60 of the dripper's body component, that from the instant of affixing its one side—15 to the inner wall surface of the hose (that is not illustrated), directed to the direction of the inside of the hose. A routing (steering) channel 65 extends along the entire length and parallel to exit pool 30, coupled to the passage of a water flow of filtered water through it from the slots array 55, and routes the flow of the filtered water towards flow passage 35.

In the example—in addition, flat and discrete dripper 10 that is illustrated in the figures with water pressure reducing means 25, includes an array of baffles 70 resembling a labyrinth, that is formed with a water flow passage 72 through it (a passage that its dimensions define the minimal flow passage through the labyrinth), and wherein passage 72 is coupled on its one end 40—to flow passage 35, and on its other side—50, to the water exit opening 45.

Any professional would understand that the configuration of the filtering means 20 and the water pressure reducing means 25, that are illustrated in the figures and were described above, might also be in different and various shapes, for example an array of round filtering openings instead of the above cited slots 55, a thin and long flow passage instead of the cited labyrinth 70, and so on.

Any professional that is also familiar with the field of manufacturing integral dripper hoses, would appreciate the forming of the filtering means 20 and the water pressure reduction means 25 in the illustrated example, while exploiting for this purpose the sorting stairs 77 and 79, namely the stairs that serve to sort the drippers' bodies before being fed into the hose (in the "up/down" orientation). Upon utilizing sorting stairs 77 and 79 for the forming of filtering means 20 and the water pressure reduction means 25, the given thicknesses of sorting stairs 77 and 79 enables to increase the dimensions of ribs 57 between slots 55, deepening routing channel 65 and deepening baffles array 70.

In the example of the flat and discrete dripper 10 that is illustrated in the figures, exit pool 30 comprises a circumferential array of walls 75 that separates between it and filter means 20, that extends on its one side, water pressure reducing means 25 that extends on its other side and water flow passage 35 that extends on it other end—80, of the dripper's body component. Any professional would understand that from the instant of affixing dripper 10 to the inner wall surface of the hose (that is not illustrated), walls array 75 is also affixed to the inner wall surface of the hose and prevents the water from leaking into exit pool 30, except if the topic is flow of the filtered water that were routed (steered) through flow passage 35, passed through flow passage 72 while reducing the water pressure that exists there and entered into the pool through water exit opening 45.

Dripper 10 is characterized in that exit pool 30 is formed wherein it is elongated in its dimensions and substantially extends along the complete length of the body component of the dripper, and in that the combined in-line filtering means 20, water pressure reduction means 25, flow passage 35 and water exit opening 45 are together circumferentially surrounding a substantial part of the elongated exit pool 30 and thus define flow passage 11 that routes the water that entered the drippers eventually towards exit pool 30. Flow passage 11 circumscribe as said a substantial part of the exit pool—three out of its four flanks (see—walls array 75), that constitute exit pool 30, and any professional would understand that in the specific example as illustrated, it even extends along approximately 90% of the total length of exit pool 30 walls array 75.

In this preferred configuration, on the one side of the elongated exit pool 30, on its entire length and parallel to it, there extends filter means 20 and on its other side—also along all its entire length and parallel to it, extends water pressure reducing means 25. Flow passage 35 is formed so that it extends on the one end—80 of the dripper's body component wherein it extends transversely across its width, and water exit opening 45 is formed at the other end 85 of the dripper's body component.

Any professional would understand that allocating one side for filter means 20, the other side for water pressure reducing means 25, and the transverse connecting side for flow passage 35 is rather an arbitrary one and those means can be spread differently while accumulated for defining circumferential flow passage 11.

Any professional would understand that in the illustrated example—the forming of the exit pool 30 wherein it is elongated at its dimensions and substantially extends along the entire length of the dipper's body—defines a length-wise axis 90, so that circumferential flow passage 11 is formed in a symmetrical manner relative to it, and wherein as depicted in the illustrated example, filter means 20 and water pressure reducing means 25 might be formed in a symmetric manner relative to it.

Any professional would also understand that the symmetric configuration combined with the modest dimensions of flow passage 35, might eliminate and cancel the need (requirement) for adjustment and orientation operations of dripper 10 in the "Forward—Backward" aspect, before the dripper is being affixed to the wall of the hose namely—it will make no difference whether dripper 10 would be fed face forward or stern forward (and see also down below when referring to FIG. 3).

Furthermore, the symmetric configuration which is depicted in the illustrated example, wherein the filtering means and the water pressure reducing means are being extended on the two sides of the exit pool and parallel to it, does not cause a substantial increase in the width (lateral) dimension of dripper 10. This is to say, the width of dripper 10 remains narrow enough and therefore enabling affixing it to a variety of different internal diameters of the different hoses (without having to restore to adapting the outline of its surface to the specific radius of the hose).

Any professional that is also familiar with the manufacturing by injection technology of the dripper's components, would appreciate the forming of exit pool 30 in an elongated shape as well as the elongated shape of the "valley" 78 between the two sorting stairs 77 and 79 for another and an additional aspect—the ability to continuously support the just injected dripper from both sides while following its extraction from the mold.

Let's refer to FIG. 3.

A sector of hose 311 of an integral dripper line 310 is illustrated in FIG. 3. In it, there are integrated discrete, flat drippers 10. In the illustrated sector 311, two drippers 10' and 10" are illustrated wherein they are integrated within the hose.

Drippers 10' and 10" are illustrated as they were fed to and positioned wherein the stern of one of them is directed to the right whereas the stern of the second is directed to the left. Thus, and as we have explained above when referring to FIGS. 1 and 2, the symmetric configuration of dripper 10, together with the modest dimensions of flow passage 35, might eliminate and cancel the need for adjustments and orientation operations of the dripper 10 in the dimension of the "forward"—"backward", before it is being affixed to the wall of the hose (i. e., it makes no difference whether dripper 10 would be fed face forward or stern forward).

This, and more—the water outlet openings 315 that are formed in the wall of hose 311 facing the elongated exit pools of the drippers and within their boundaries, are in the configuration of a thin and long slit endowed by the self closing property from the instant the water pressure in the hose declines.

Thus, configuring exit pool 30, wherein it is elongated in its dimensions and substantially extends along the entire length of the body component of dripper 10, enables one to implement a water outlet opening in the form of a thin and long slit in conjunction with a discrete dripper.

Moreover, as we have pointed above, the symmetric configuration of dripper 10 coupled with the modest dimensions of flow passage 35, might also enable implementing such an outlet opening independently of the direction of feeding the discrete drippers.

It is to be noted that the hose 311 is illustrated as an extruded hose, but any professional would understand that discrete and flat integral drippers in accordance with the present invention might also be implemented on a flat sheet before it is folded to make a hose with a seam ("stitch") or serve as integral drippers in a tubular (hose like) conduit that is implemented by another and different technology (for example—blowing).

Reference is being Made to FIGS. 4 to 10.

An implementation (embodiment) of the invention in a discrete, flat dripper 410 is illustrated in FIGS. 4 to 10. This discrete, flat dripper 410 is one of the types of drippers that enables constant flow rate, not withstanding variations of the water pressure in the hose, namely—implementing the invention in a discrete, flat dripper of the pressure compensated or—in other words, flow rate regulated type of drippers. FIGS. 4 and 5 constitute exploded (parts break down) views of the components of dripper 410 (illustrated for two different viewing angles). FIGS. 6 and 7 constitute views in perspective—from two different viewing angles, of dripper 410 wherein it is shown in its assembled state. FIG. 8 shows a cross section view of dripper 410 that is illustrated in FIG. 6 (along the line marked a-a). FIG. 9 constitutes a cross section view of dripper 410 that is illustrated in FIG. 6 (along the line marked b-b). FIG. 10 constitutes a view in perspective of a cross section of a sector 1011 of an integral dripper hose 1010 in which there is integrated dripper 410.

Similarly to dripper 10 (that is a non-pressure compensated/non-flow rate regulated dripper) that was illustrated in FIGS. 1 to 3 and described above, pressure compensated/flow rate regulated dripper 410 also comprises a body component 412 whose configuration is essentially rectangular, wherein on its one side—415, that is suited to being affixed unto an internal wall of the hose, is formed with an exit pool 430 that is elongated in its dimensions and substantially extends along the entire length of body component 412, and with a flow passage 411 circumferentially surrounding a substantial part of elongated exit pool 430 for routing the water that entered the drippers towards exit pool 430.

Similarly to dripper 10 (that is a non-pressure compensated/non-flow rate regulated dripper) that was illustrated in FIGS. 1 to 3 and described above, also in pressure compensated/flow rate regulated dripper 410 (see FIG. 6), forming of exit pool 430, where it is elongated in its dimensions and substantially extends along the entire length of body component 412, defining a lengthwise axis 490 so that circumferential flow passage 411 is formed in a symmetrical manner relative to it.

Regulated dripper 410 also comprises, in addition, a cover component 510 and an elastomer membrane 515.

Body component 412 is formed in two levels (stories) 520 and 525. The one level 520 extends on its one side 415 of the body component that from the instant of its installation in the hose it faces the wall of the hose and is formed, as said, with the elongated exit pool 430 and with the circumferential water flow passage 411 that routes the flow towards the exit pool 430, and with a circumferential walls array 475 that buffers (separates) between the elongated exit pool and the circumferential flow passage 411.

In the illustrated example, circumferential flow passage 411 comprises water pressure reducing means 425. Water pressure reducing means 425 comprises a baffles array 470 resembling a labyrinth that is formed with a passage 472 through it.

Circumferential flow passage 411 circumferentially surrounds a substantial part of the elongated exit pool 430 and eventually routes the water that enter the drippers towards exit pool 430. As said, flow passage 411 circumscribes a substantial part of the exit pool—verily almost the total length of its four flanks (see—walls array 475), that constitute exit pool 430, and any professional would understand that in the specific example as illustrated, it even extends along approximately 90% of the total length of exit pool 430 walls array 475.

The second level (stories) 525 extends on the second side 460 of body component 412, which is the side that from the instant of the dripper installation in the hose faces the inner side of the hose. Level 525 is formed with water entrance chamber 530 and with regulating chamber 535.

First water flow passage opening 540 is formed in body component 412 wherein it is connected to a flow passage between level 520 to level 525. See in FIGS. 4, 5 and 8, the opening 540 that is connected to water flow passage from water entrance chamber 530 to a one end 440 of circumferential flow passage 411.

Second water flow passage opening 545 is formed in body component 412 wherein it is connected to a flow passage back from level 525 to level 520. See in FIGS. 4, 5 and 9, opening 545 that is connected to water flow passage from a second end 450 of circumferential flow passage 411 to a one side 550 of regulating chamber 535.

Third water flow passage opening 555 is formed in body component 412 wherein it is connected to a flow passage back from level 520 to level 525. See in FIGS. 4, 5 and 9, opening 555 that is connected to water flow passage from its one side 550 of the regulating chamber 535 unto the elongated exit pool 430.

Cover component 510 is adapted to be installed on the second side 460 of body component 412 (for example, by ultra sonic soldering, bonding or a mechanical connector—e.g.—snap fit). Cover component 510 is formed with filtering means 420 in order to filter the water entering into water entrance chamber 530.

In the illustrated example, filtering means 420 is made in the configuration of an array of slots 455 that is formed wherein it extends over the greater part of the surface area of cover component 510. Allocating the greater part of the cover component surface area to serve the filtering task, naturally contributes to the cleanliness of the water that flow into the dripper and reduces the danger of the formation of clogging up entities in the narrow flow passages that are formed in it.

In the illustrated example (see FIG. 5), water entrance chamber 530 is formed with an array of ribs 557 that routes the entering water flow from filtering means 420 towards the first water flow passage opening 540. The array of ribs might contribute to prevent the formation and/or accumulation of residues of dirt that is left in the water even though it was filtered by the filtering means.

Concurrently with the filtering of the water that enters the water entrance chamber 530 and for the sake of the needs of the regulating mechanism, cover component 510 also enables the entering of water to the second side 560 of regulating chamber 535 (see in FIGS. 9 and 10).

Elastomer membrane 515 is adapted to being installed within regulating chamber 535 in a manner that it separates between one side 550 of the regulating chamber 535 and the other side 560 the chamber. The positioning of the membrane enables its movement towards third water flow passage opening 555 and away from it, subject to the difference of the pressures that prevails on the membrane two sides (on the one end—the pressure of the water in the hose, and on the other the pressure of the water as it was reduced during its passage in the dripper)—and thus regulation of the water flow from the dripper is achieved (see FIGS. 9 and 10).

Dripper 410 is illustrated and described as it implements the invention wherein it is assembled from three different discrete components, namely—pressure body component 412, cover component 510 and Elastomer membrane 515, but any professional would understand that it is also feasible to manufacture a discrete, flat pressure compensated/flow rate regulated dripper that would implement the invention while made of only two components. For example, it is possible to manufacture the cover component as an integral part combined (unified) with the body component, wherein the installation of the cover component over the body component is enabled by employing an integral hinge that is formed between them and as an integral part of them (professionals are acquainted with an implementation of such an integral hinge in a structure of drippers—see for example U.S. Pat. No. 6,568,607). Another feasible example—the cover component and the membrane component are manufactured as a single integrated component (separately from the body component) for example—by resorting to use a bi-component injection process technology of two different materials. Moreover, it is even feasible to manufacture a dripper that would implement the invention even though using a single component—the elastomer membrane would be manufactured (produced) as an integral part of the cover component (as said, by resorting to use a bi-component injection process of two different materials) and they will be connected to the body component by an integral hinge (an hinge as described for example in the U.S. Pat. No. 6,568,607 cited above).

As can be seen in FIG. 10, similarly to the example of non-regulating dripper 10 that is illustrated in FIG. 3, also dripper 410 is given to be fed "Front" ("bow") forward or "aft" forward, due to their symmetric construction and the modest dimensions, as said, of the circumferential flow passage 411 on the two ends of exit pool 430. Thus, also the water outlet opening 1015 that is formed in the wall of hose 1011 facing the elongated exit pool of dripper 410 and within its boundaries, is in the configuration of a thin and long slit endowed by the self closing property from the instant the water pressure in the hose declines.

Thus, configuring exit pool 430, wherein it is elongated in its dimensions and substantially extends along the entire length of the body component of dripper 410, enables to implement a water outlet opening in the form of a thin and long slit in conjunction with a discrete flat dripper of the pressure regulated or in other words—pressure compensated type.

Moreover, as we have pointed above, the symmetric configuration of dripper 410 coupled with the modest dimensions of circumferential flow passage 411, might also enable implementing such an outlet opening independently of the direction of feeding the discrete drippers.

Subject to what is described above while referring to the accompanying figures, any professional in drip irrigation devices design would appreciate the advantages of the discrete, flat dripper in accordance with the present invention—

Relatively small in its dimensions, in a manner that leads to saving on the raw materials required for its production; thin enough at its width dimension so as to instill on it versatility in all that is concerned with capability to affixing the drippers in a wide range of inner diameters of the hoses; it might be symmetric in a manner that would not impose adjustments and orientation operations of the "forward"—"backward" aspect (namely—it makes no difference whether the dripper is fed with the front forward or with the stern forward); having filtering means large enough—in order to ensure efficient filtering of the flow of the water into it; endowed with water pressure reducing means (for example in the configuration of a labyrinth)—that is long enough in order to ensure efficient reduction of the water pressure while maintaining a minimal passage of water flow that is wide enough for reducing the danger of being clogged (blocked up); and formed with relatively large exit "pool" in a manner that substantially facilitates to conform with the challenge of forming a water outlet opening in the wall of the hose, with accuracy so that it is exactly opposite the exit "pool" and that would also enable using a water outlet opening endowed with "self closing" features (namely—having a water outlet opening in a thin and long slit configuration).

The invention has been described using various detailed descriptions of embodiments thereof that are provided by way of example and is not intended to limit the scope of the invention. A described embodiment might comprise different features, wherein not all of them are required in all embodiments of the invention. Some embodiments of the invention utilize only some of the features or possible combinations of the features. Variations of the embodiment of the invention that is described and embodiments of the invention comprising different combinations of features noted in the described embodiment will occur to persons with skill in the art. It is intended that the scope of the invention be limited only by the claims and that the claims be interpreted to include all such variations and combinations.

The invention claimed is:

1. A pressure compensated and flow rate regulated flat dripper, comprising:
    a rectangular body component configured to affix to an inner wall of a hose, wherein said body component comprises:
    a first level extending on a first side of said body component that is adapted to face towards the inner wall of said hose, the first level having an elongated exit pool and a flow passage, wherein the elongated exit pool extends along a length of said body component, said flow passage comprising a baffles array resembling a labyrinth that is formed with a water pressure reducer passage through the baffles array configured to reduce pressure of water therein, said flow passage extending parallel and along at least one elongated side of the elongated exit pool;
    a second level extending on a second side of said body component opposite said first side and adapted to face an inner side of said hose;
    a first water flow passage opening configured to allow water to flow from said second level into a first end portion of said flow passage on said first level;
    a second water flow passage opening configured to allow water to flow between said first and second levels, said second water flow passage opening forming a passage from a second end portion of said flow passage on said first level into said second level; and a third water flow passage opening configured to allow water to flow from said second water into said elongated exit pool;

a filter for filtering the flow of water entering said dripper from said hose and flowing towards said first water flow passage opening;

a cover component adapted for being installed on said second side of said body component, said cover component comprising an integral part combined with said body component by coupling to said body component by an integral hinge, whereby installation of said cover component over said body component is enabled by employing said hinge to affix said cover component to said second level of said body component; and an elastomer membrane configured to assist in regulation of the water flow exiting the dripper by enabling movement of said elastomer membrane towards and away from said third water flow passage opening depending on a difference of the water pressures that prevail between the water pressure in the hose acting on a first side of said elastomer membrane and the reduced water pressure from said baffles array acting on a second side of said elastomer membrane, said elastomer membrane comprising an integral joined part of said cover component.

2. The pressure compensated and flow rate regulated flat dripper in accordance with claim 1, wherein said body component, cover component and said elastomer membrane are manufactured as a single integrated component by a bi-component injection process technology of two different materials.

3. The pressure compensated and flow rate regulated flat dripper in accordance with claim 1, wherein said elongated exit pool defines a lengthwise axis of said body component and said flow passage on said first level encircles at least a portion of a first, second, and third lateral side of said elongated exit pool.

4. A dripper line comprising at least one pressure compensated and flow rate regulated flat dripper according to claim 1, integrated in said hose.

5. The dripper line according to claim 4, further comprising a water outlet opening having a thin and long slit, being formed at said wall of said hose opposite said dripper's elongated exit pool and within the boundaries of said elongated exit pool.

6. A pressure compensated and flow rate regulated flat dripper, comprising:

a rectangular body component configured to affix to an inner wall of a hose, wherein said body component comprises:

a first level extending on a first side of said body component that is adapted to face towards the inner wall of said hose, the first level having an elongated exit pool and a flow passage, wherein the elongated exit pool extends along a length of said body component, said flow passage comprising a baffles array resembling a labyrinth that is formed with a water pressure reducer passage through the baffles array configured to reduce pressure of water therein, said flow passage extending parallel and along at least one elongated side of the elongated exit pool;

a second level extending on a second side of said body component opposite said first side and adapted to face an inner side of said hose;

a first water flow passage opening configured to allow water to flow from said second level into a first end portion of said flow passage on said first level:

a second water flow passage opening configured to allow water to flow between said first and second levels, said second water flow passage opening forming a passage from a second end portion of said flow passage on said first level into said second level; and a third water flow passage opening configured to allow water to flow from said second water flow passage into said elongated exit pool on said first level;

a cover component adapted for being installed on said second side of said body component, said cover component comprising an integral part combined with said body component by coupling to said body component by an integral hinge, whereby installation of said cover component over said body component is enabled by employing said hinge to affix said cover component to said second level of said body component;

a filter for filtering the flow of water entering said dripper from said hose and flowing towards said first water flow passage opening; and an elastomer membrane housed within said regulating chamber between and separating said first side of said regulating chamber and said second side of said regulating chamber, thereby assisting in regulation of the water flow exiting the dripper by enabling movement of said elastomer membrane towards and awayfrom said third water flow passage opening depending on a difference of the water pressures that prevails within either the first side or the second side of the regulating chamber, said elastomer membrane comprising an integral joined part of said cover component.

7. The pressure compensated and flow rate regulated flat dripper in accordance with claim 6, wherein said body component, cover component and said elastomer membrane are manufactured as a single integrated component by a bi-component injection process technology of two different materials.

8. The pressure compensated and flow rate regulated flat dripper in accordance with claim 6, wherein said filter is formed on said body component.

9. The pressure compensated and flow rate regulated flat dripper in accordance with claim 6, wherein said elongated exit pool defines a lengthwise axis of said body component and said flow passage on said first level encircles at least a portion of a first, second, and third lateral side of said elongated exit pool.

10. A dripper line comprising at least one pressure compensated and flow rate regulated flat dripper according to claim 6, integrated in said hose.

11. The dripper line according to claim 10, further comprising a water outlet opening having a thin and long slit, being formed at said wall of said hose opposite said dripper's elongated exit pool and within the boundaries of said elongated exit pool.

12. A pressure compensated and flow rate regulated flat dripper, comprising:

a rectangular body component configured to affix to an inner wall of a hose, wherein said body component comprises:

a first level extending on a first side of said body component that is adapted to face towards the inner wall of said hose, the first level having an elongated exit pool and a flow passage, wherein the elongated exit pool extends along a length of said body component, said flow passage comprising a baffles array resembling a labyrinth that is formed with a water pressure reducer passage through the baffles array configured to reduce pressure of water therein, said flow passage extending parallel and along at least one elongated side of the elongated exit pool;

a second level extending on a second side of said body component opposite said first side and adapted to face an inner side of said hose;

a first water flow passage opening configured to allow water to flow from said second level into a first end portion of said flow passage on said first;

a second water flow passage opening configured to allow water to flow between said first and second levels, said second water flow passage opening forming a passage from a second end portion of said flow passage on said first level into said second level; and a third water flow passage opening configured to allow water to flow from said second water flow passage into said elongated exit pool on said first level;

a cover component adapted for being installed on said second side of said body component, said cover component comprising an integral part combined with said body component by coupling to said body component by an integral hinge, whereby installation of said cover component over said body component is enabled by employing said hinge to affix said cover component to said second level of said body component; and a filter for filtering the flow of water entering said dripper from said hose and flowing towards said first water flow passage opening; and an elastomer membrane housed within said regulating chamber between and separating said first side of said regulating chamber and said second side of said regulating chamber, thereby assisting in regulation of the water flow exiting the dripper by enabling movement of said elastomer membrane towards and awayfrom said third water flow passage opening depending on a difference of the water pressures that prevails within either the first side or the second side of the regulating chamber, said elastomer membrane comprising an integral joined part of said cover component, wherein said body component, cover component and said elastomer membrane are manufactured as a single integrated component by a bi-component injection process technology of two different materials.

13. The pressure compensated and flow rate regulated flat dripper in accordance with claim 12, wherein said filter is formed on said body component.

14. The pressure compensated and flow rate regulated flat dripper in accordance with claim 12, wherein said elongated exit pool defines a lengthwise axis of said body component and said flow passage on said first level encircles at least a portion of a first, second, and third lateral side of said elongated exit pool.

15. A dripper line comprising at least one pressure compensated and flow rate regulated flat dripper according to claim 12, integrated in said hose.

16. The dripper line according to claim 15, further comprising a water outlet opening having a thin and long slit, being formed at said wall of said hose opposite said dripper's elongated exit pool and within the boundaries of said elongated exit pool.

* * * * *